Feb. 4, 1930.  G. A. LYON  1,745,428
BUMPER
Filed March 6, 1928    2 Sheets-Sheet 2

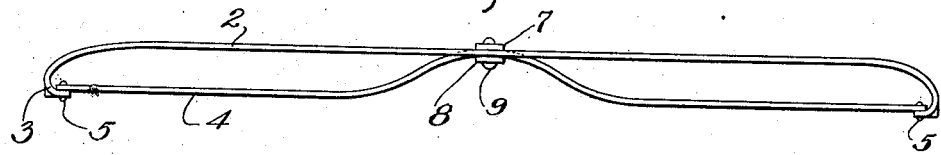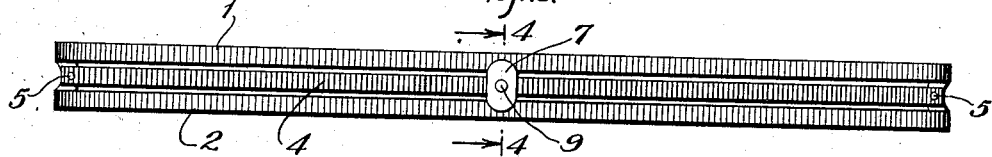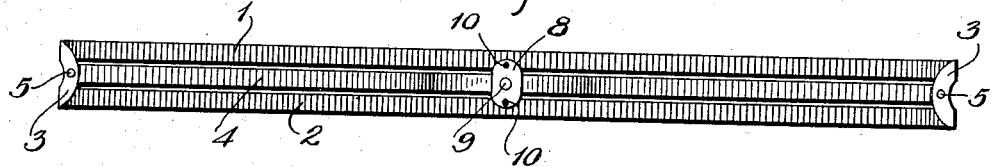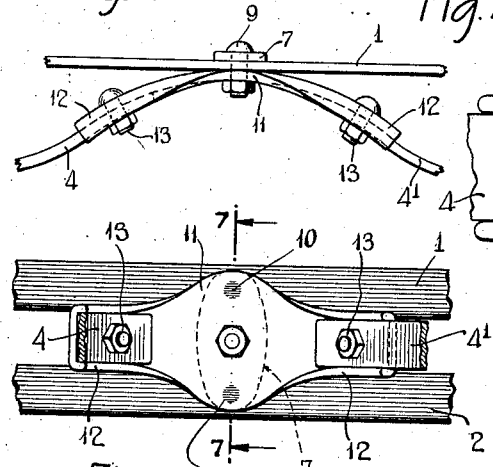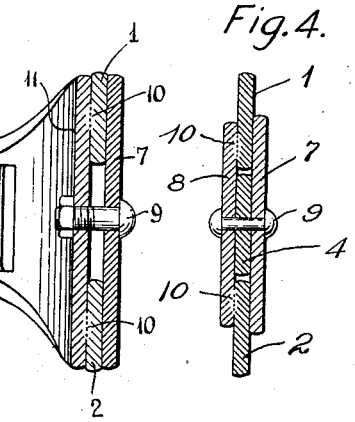

INVENTOR
GEORGE ALBERT LYON
BY
*Frederick S. Duncan,* ATTORNEY

Patented Feb. 4, 1930

1,745,428

UNITED STATES PATENT OFFICE

GEORGE ALBERT LYON, OF ALLENHURST, NEW JERSEY, ASSIGNOR, BY MESNE ASSIGNMENTS, TO AMERICAN CHAIN COMPANY, INC., A CORPORATION OF NEW YORK

BUMPER

Application filed March 6, 1928. Serial No. 259,402.

This invention relates to automobile bumpers and more particularly to a device for holding the bars of a multi-bar bumper in rigid alignment.

As is well known in the art, connectors having front and rear plates which are clamped about the bars of a bumper are used to secure the bars of the front or impact section of a bumper to the rear or supporting bar. These connectors have a disadvantage in that they work loose or bend and permit the bars of the impact section to be forced apart and out of alignment when the bumper is in a collision.

Another disadvantage is that of the noise caused by rattling of the plates when the parts become loosened.

It is therefore the principal object of this invention to provide a connector which will rigidly secure the bars of a multi-bar bumper in vertical alignment and prevent them from horizontal or vertical displacement.

Another object is to provide a connector which will securely hold the bars of the impact section in such a manner that they will act as a unitary structure.

A still further object is to provide a connector which will securely hold the impact bars of a multi-bar bumper from working loose and thereby rattling.

A clear conception of the construction and further objects of this invention may be had from the following specification in conjunction with the accompanying drawings, in which Fig. 1 is a plan view of a bumper embodying the invention;

Fig. 2 is a front view of Fig. 1;

Fig. 3 is a rear view of Fig. 1;

Fig. 4 is a cross-section through 4—4 of Fig. 2;

Fig. 5 is an enlarged segmental plan view of a bumper embodying a modified form of connector;

Fig. 6 is a rear view of Fig. 5;

Fig. 7 is a cross-section through 7—7 of Fig. 6;

Figure 8:
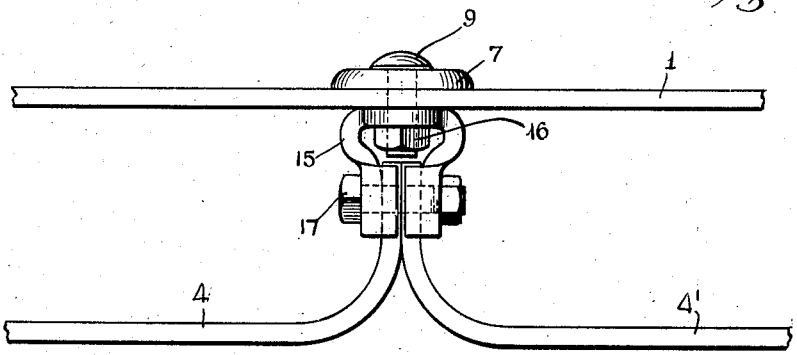
Fig. 8 is an enlarged segmental plan view of a bumper embodying a still further modified form of connector.

The bumper shown in Figs. 1, 2 and 3 is of the multi-bar type, having an impact structure comprising two bar portions 1 and 2 which are preferably formed of a continuous strip of spring steel having its end portions bent rearwardly and inwardly as shown at 3 in Fig. 1. A rear bar 4, preferably formed substantially as shown, is secured at its extreme ends to the end portions 3 suitably, as for example, by bolts or, as shown, by means of rivets 5. The center portion of the rear bar 4 is bent forward, as shown in Fig. 1, to the bars 1 and 2 of the impact member and is secured thereto by a connector hereinafter described. It is to be understood that this type of connector may be used on any form of multi-bar bumper and is only limited by the formation of the rear bar.

The connector comprises two metal plates 7 and 8 which are disposed at the front and rear of the impact sections and are preferably each provided with a hole for a fastener such as a bolt or, as shown, the rivet 9. A hole is also provided in the center of the back bar 4 through which the rivet 9 passes, thereby securing the plates 7 and 8 and the bar 4 together as shown in Fig. 4. The plate 8 is secured metallically as shown in Figs. 3 and 4 to the rear of the bars 1 and 2 at points 10. This metallic union of the plate 8 to the impact bars is preferably accomplished by spot-welding at the points 10 and constitutes the plate 8 an integral part of the impact bars 1 and 2, thereby securely joining the two bars together and forming a unitary structure.

The welding of the plate 8 to bars 1 and 2 forms a union which, if correctly made, will endure as long as the bumper and will not work loose due to vibration. This rigid union prevents the bars 1 and 2 from flying apart and out of vertical alignment under the impact of a collision, and thereby causes both bars to act as a unit.

The front plate 7 is merely a cover or ornamental name plate for covering any disfigurement of the bumper bars caused by the spot-welding. If desired, the front plate may be omitted without in any way hampering the action of the connector.

In assembling the bumper, the rear bar 4 is preferably introduced from the front of the bumper and is then secured at its ends to the curved portion 3 by the rivets 5 and at its center to the plate 8 by rivet 9.

The spot welding of plate 8 may be performed after the impact bars have been nickeled at which time the plate 7 is used to cover any disfigurement. The welding may also be done before the bars are polished and nickeled thereby obviating any chance of marring the nickel and thereby doing away with the necessity of plate 7.

The modified form of connector shown in Figs. 5, 6 and 7 embodies the same features and therefore the same designating numerals will be used to simplify the description.

The rear plate 11 is formed as shown with the channel-shaped ears 12. The channel section of the ears 12 is of a sufficient width to accommodate a back bar which, in this particular type, is formed of two portions 4 and 4'. The ends of the back bars are bolted to the ears of plate 11 by means of bolts 13 and are held in horizontal alignment by the edges of the channel section. It is obvious that this type of clamp may be used with a single back bar which is bolted to the ears 12 of plate 11 by the bolts 9 and 13. The plate 11 is spot-welded to the bars 1 and 2 at 10—10 in a similar manner to that described above, and the front plate 7 is secured to plate 11 by bolt 9.

This modified form provides a more rigid connector for the back bars which are held in horizontal as well as vertical alignment by the channel section of ears 12.

Figure 9:
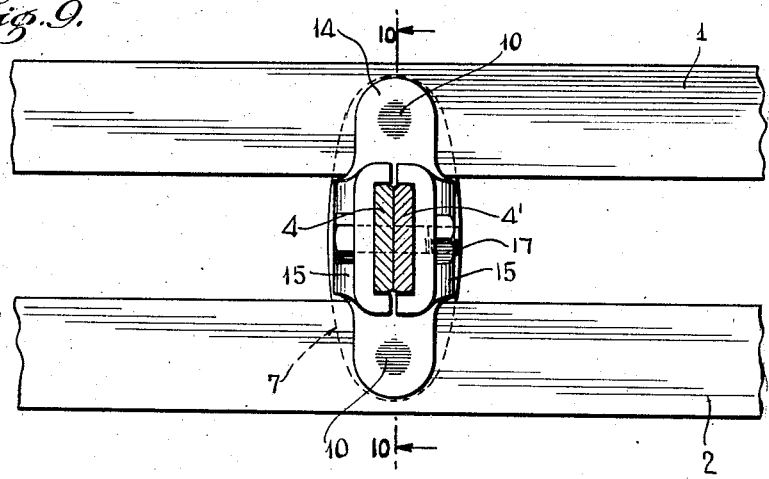
Fig. 9 is a rear view of Fig. 8.
Figure 10:
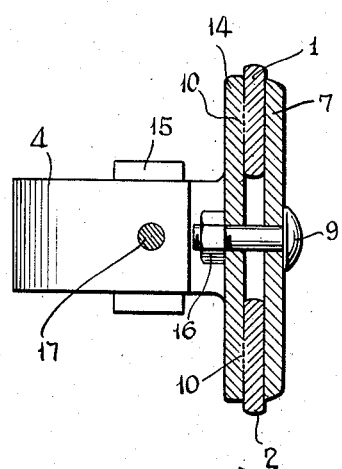
Fig. 10 is a cross-section through 10—10 of Fig. 9.

A further modification of this type of connector is shown in Figs. 8, 9 and 10. As shown in Fig. 8, the rear bar is formed in two parts, 4 and 4', the ends of which are bent forwardly until the extreme ends are parallel. The rear plate 14 is formed with ears 15 which are bent as shown to accommodate the nut 16 and are channel-shaped in their end portion to form a socket to accommodate the ends of the rear bars 4 and 4' as shown in Fig. 9. The ears 15 near their extremity are provided with holes for a purpose hereinafter described. In assembling this type of connector, the plate 14 is spot-welded to the bars 1 and 2 at 10, and the front plate 7 is then secured to the bars by bolt 9 and nut 16. The ends of bars 4 and 4' are provided with holes which coincide with the holes in the ears 15 above mentioned. A bolt 17 is passed through the holes, and the ears 15 are drawn up into close engagement with the ends of bars 4 and 4'. The bars are thus held in horizontal alignment by the channeled ends of ears 15.

It is obvious from the above description that this type of connector forms a means for rigidly securing the bars of a multi-bar bumper in both vertical and horizontal alignment and forms a permanent rigid connection between the separate bars of the impact section and the rear bar.

I claim:

1. In a bumper, an impact section comprising a plurality of impact bar portions spaced in vertical alignment, a rear bar having its ends secured to the ends of said impact section, a connector comprising two plates, one of said plates being welded to said impact bar portions respectively at a region intermediate the ends of said impact section to form a unitary impact section, and means for securing the other of said plates in position to cover the welded portions of said impact section.

2. In a bumper, an impact section comprising a plurality of impact bar portions spaced in vertical alignment, a rear bar, a connector comprising two plates, one of said plates being welded to the rear of said impact bar portions to form an integral structure, and means for securing the other of said plates to said rear plate and against the front of said impact section in position to cover the welded portion of said impact section.

3. In a bumper, an impact section comprising a plurality of impact bar portions spaced in vertical alignment, a rear bar, a connector comprising two plates, one of said plates being welded to the rear of said impact bar portions, and a bolt for securing the other of said plates to said rear plate and against the front of said impact section in a position to cover the welded portion of said impact section.

4. In a bumper, an impact section made of strip steel formed into a plurality of vertically spaced and aligned impact bar portions connected integrally at the ends of the impact section, a separately formed rear bar of strip steel having its ends connected with the connector portions of said impact section and a connector plate welded to said impact portions respectively at a region intermediate the ends of said impact section, and a face plate secured to said connector plate by a fastening member passing through said rear bar.

5. In a clamp of the type described, a plate having ears thereon of channel section, said plate being adapted to be welded to the impact bars of a multi-bar bumper to hold said bars from vertical displacement, a rear bar for said bumper, the ends of which are secured to the ends of said impact section, and the mid portion of which is held in horizontal alignment by said ears, and means for securing said rear bar in the channel section of said ears.

In testimony whereof, I have signed this application.

GEORGE ALBERT LYON.